(12) United States Patent
Janakiraman et al.

(10) Patent No.: US 8,954,080 B2
(45) Date of Patent: Feb. 10, 2015

(54) MONITORING TRAFFIC ACROSS DIAMETER CORE AGENTS

(71) Applicant: Tektronix, Inc., Beaverton, OR (US)

(72) Inventors: Vignesh Janakiraman, Plano, TX (US); John P. Curtin, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 180 days.

(21) Appl. No.: 13/715,699

(22) Filed: Dec. 14, 2012

(65) Prior Publication Data

US 2014/0171089 A1 Jun. 19, 2014

(51) Int. Cl.
| | | |
|---|---|---|
| *H04W 40/00* | (2009.01) | |
| *H04W 28/08* | (2009.01) | |
| *H04W 24/00* | (2009.01) | |
| *H04L 29/06* | (2006.01) | |
| *H04W 12/06* | (2009.01) | |
| *H04L 12/26* | (2006.01) | |
| *H04L 12/14* | (2006.01) | |
| *H04W 84/04* | (2009.01) | |

(52) U.S. Cl.
CPC .............. *H04W 28/08* (2013.01); *H04W 24/00* (2013.01); *H04W 40/00* (2013.01); *H04L 43/04* (2013.01); *H04L 63/0892* (2013.01); *H04L 43/026* (2013.01); *H04L 43/028* (2013.01); *H04L 43/12* (2013.01); *H04L 12/1407* (2013.01); *H04W 12/06* (2013.01); *H04W 84/042* (2013.01)

USPC .......................................... 455/445

(58) Field of Classification Search
CPC ..... H04L 63/0892; H04L 69/08; H04L 12/66; H04W 4/24
USPC .......................................... 455/445
See application file for complete search history.

(56) References Cited

U.S. PATENT DOCUMENTS

| | | | | |
|---|---|---|---|---|
| 2009/0080440 | A1 * | 3/2009 | Balyan et al. ............... | 370/400 |
| 2011/0116382 | A1 * | 5/2011 | McCann et al. ............. | 370/241 |
| 2011/0202676 | A1 * | 8/2011 | Craig et al. ................. | 709/238 |
| 2013/0117308 | A1 * | 5/2013 | Korhonen ................... | 707/770 |
| 2013/0346549 | A1 * | 12/2013 | Craig et al. ................. | 709/217 |
| 2014/0003225 | A1 * | 1/2014 | Mann et al. ................. | 370/216 |

* cited by examiner

*Primary Examiner* — Nathan Mitchell
(74) *Attorney, Agent, or Firm* — Edwards Wildman Palmer LLP; Scott D. Wofsy; Christopher J. Capelli

(57) ABSTRACT

Systems and methods for monitoring traffic across Diameter Core Agents (DCAs) such as, for example, Diameter Signaling Routers (DSRs) and/or Diameter Routing Agents (DRAs). In some embodiments, a method may include receiving a first set of one or more messages at a telecommunications monitoring system, the first set of one or more messages transmitted between a Diameter client and a Diameter device. The method may also include receiving a second set of one or more messages at the telecommunications monitoring system, the second set of one or more messages transmitted between the Diameter device and a Diameter server. The method may further include correlating the first set of one or more messages with the second set of one or more messages as part of a single Diameter call.

20 Claims, 4 Drawing Sheets

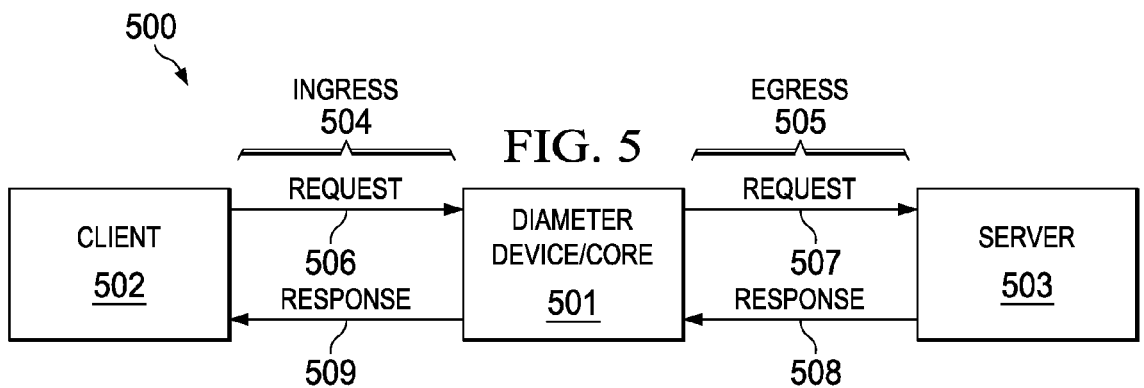
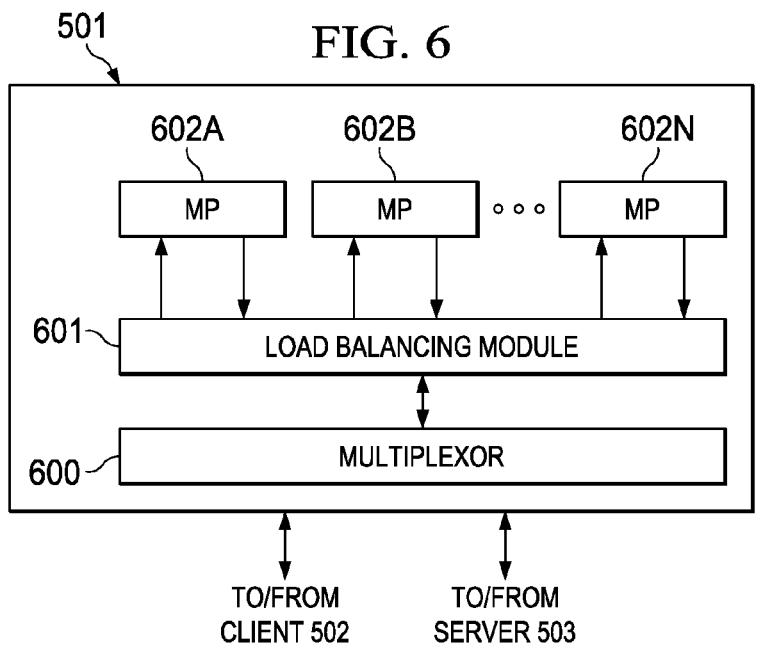
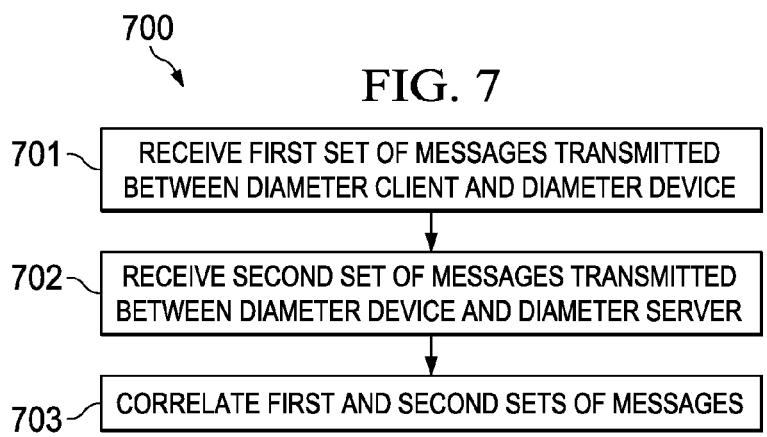

MONITORING TRAFFIC ACROSS DIAMETER CORE AGENTS

BACKGROUND

Mobile data networks continue to experience an unprecedented explosion in total traffic, particularly as new types of client devices (e.g., web-enabled smart phones, tablet devices, Internet-enabled TVs, gaming consoles, etc.) consume increasingly large amounts of bandwidth. Nowadays, data speeds of network traffic can be as high as 100 Gigabit/second (Gb/s). Accordingly, network operators are migrating from 3G to 4G Long-Term Evolution (LTE) technologies in order to handle this growth and demand.

Certain industry organizations (e.g., 3GPP) have specified the use of the "Diameter protocol" for an Authentication, Authorization, and Accounting (AAA) operations in LTE and Internet Protocol (IP) Multimedia Subsystem (IMS) networks; but there has not been an effort to specify a corresponding Diameter signaling infrastructure. Moreover, as Diameter traffic levels swell, the lack of infrastructure can pose a number of scalability and interconnectivity problems. At least in part to address some of these concerns, entities such as Diameter Signaling Routers (DSRs) and Diameter Routing Agents (DRAs)—referred to as Diameter Core Agents (DCAs)—have been created to relieve LTE and IMS endpoints of certain Diameter routing and load balancing operations.

Generally speaking, network operators may employ network monitoring solutions configured to monitor their services, performance, customer experience, equipment issues, etc. In the present environment, however, the inventors hereof have identified and foreseen a number of issues related to the monitoring of Diameter devices, including, for example, the following: (1) an enormous amount of Diameter traffic may leave and enter the ports of DCA(s), thus making cost-effective monitoring of DCA(s) a challenge; (2) network operators will become more and more concerned with the performance and routing functionality of DCA(s), and are likely to seek a monitoring solution capable of providing specific Key Performance Indicators (KPIs) that give insight into the operation of DCA(s); and (3) there will be a need to provide end-to-end correlated view of signaling messages and transactions.

In view of these, and other concerns, the inventors hereof have developed systems and methods for monitoring traffic across DCAs.

SUMMARY

Embodiments of systems and methods for monitoring traffic across monitoring traffic across Diameter Core Agents (DCAs) are described herein. In an illustrative, non-limiting embodiment, a method may include receiving a first set of one or more messages at a telecommunications monitoring system, the first set of one or more messages transmitted between a Diameter client and a Diameter device; receiving a second set of one or more messages at the telecommunications monitoring system, the second set of one or more messages transmitted between the Diameter device and a Diameter server; and correlating the first set of one or more messages with the second set of one or more messages as part of a single Diameter call.

For example, the first and second sets of one or more messages may follow a Diameter protocol, and the Diameter device may be include Diameter Core Agents (DCAs) such as, for example, Diameter Signaling Routers (DSRs) and/or Diameter Signaling Agents (DSAs). Also, the first set of one or more messages may include a request and a response, the method further comprising correlating the request with the response. In some implementations, correlating the request with the response may include matching an Internet Protocol (IP) address and a Hop-by-Hop identifier (ID) in the request against the IP address and the Hop-by-Hop ID in the response.

Additionally or alternatively, the second set of one or more messages may include another request and another response, the method further comprising correlating the other request with the other response. For example, correlating the other request with the other response may include matching an Internet Protocol (IP) address and a Hop-by-Hop identifier (ID) in the other request against the IP address and the Hop-by-Hop ID in the other response.

In some cases, correlating the first set of one or more messages with the second set of one or more messages may include matching an origin host and an End-to-End identifier (ID) in the first set of one or more messages against the origin host and the End-to-End ID in the second set of one or more messages. In other cases, correlating the first set of one or more messages with the second set of one or more messages may include matching a session identifier (ID) Attribute-Value Pair (AVP) and an End-to-End ID in the first set of one or more messages against the session ID AVP and the End-to-End ID in the second set of one or more messages. In yet other cases, correlating the first set of one or more messages with the second set of one or more messages may include extracting a larger number of Attribute-Value Pairs (AVPs) from the first set of one or more messages than from the second set of one or more messages. In still other cases, correlating the first set of one or more messages with the second set of one or more messages may include extracting only modified AVP(s) from the second set of one or more messages.

In some implementations, the method may include measuring a load distribution in the Diameter device based, at least in part, upon the correlation. The method may also include extracting an origin host AVP from an egress request message.

In some embodiments, one or more of the techniques described herein may be performed by one or more network monitoring systems. In other embodiments, a tangible computer-readable storage medium may have program instructions stored thereon that, upon execution by one or more network monitoring systems, cause the one or more network monitoring systems to perform one or more operations disclosed herein. In yet other embodiments, a system may include at least one processor and a memory coupled to the at least one processor, the memory configured to store program instructions executable by the at least one processor to cause one or more network monitoring systems to perform one or more operations disclosed herein.

BRIEF DESCRIPTION OF THE DRAWINGS

Reference will now be made to the accompanying drawings, where:

FIG. 5 is a block diagram of an example of a Diameter portion of a network where a monitoring system may be deployed according to some embodiments.

FIG. 6 is a block diagram of an example of a Diameter core or device(s) according to some embodiments.

FIG. 7 is a flowchart of an example of a method for monitoring traffic across a Diameter core or device according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
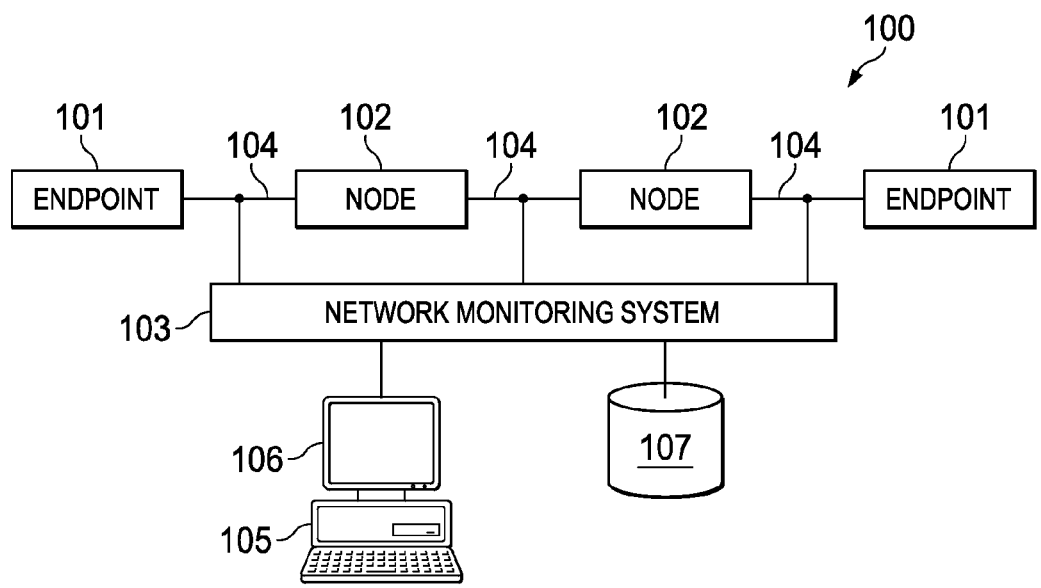
FIG. 1 is a block diagram of an example of a network monitoring environment according to some embodiments.

FIG. 1 illustrates a block diagram of a network monitoring environment according to some embodiments. Particularly, telecommunications network 100 includes network nodes 102 and endpoints 101. For example, network 100 may include a wireless broadband network, a 3G network, a 4G network, a 3GPP Long Term Evolution (LTE) network, a voice-over-IP (VoIP) network, an IP Multimedia Subsystem (IMS) network, etc. Although only two nodes 102 and two endpoints 102 are shown in FIG. 1, it will be understood that network 100 may comprise any number of nodes 102 and endpoints 101. Moreover, it will be understood that the nodes 102 and endpoints 101 in network 100 may be interconnected in any suitable manner, including being coupled to one or more other nodes 102 and/or endpoints 101.

In some implementations, endpoints 101 may represent, for example, computers, mobile devices, user equipment (UE), client applications, server applications, or the like. Meanwhile, nodes 102 may be components in an intranet, Internet, or public data network, such as a router or gateway. Nodes 102 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a Long Term Evolution/Service Architecture Evolution (LTE/SAE) network or any other core network nodes or routers that transfer data packets or messages between endpoints 101. Examples of these, and other elements, are discussed in more detail below with respect to FIG. 4.

Still referring to FIG. 1, many packets traverse links 104 and nodes 102, as data is exchanged between endpoints 101. These packets may represent many different sessions and protocols. For example, if endpoint 101 is used for a voice or video call, then it may exchange Voice over Internet Protocol (VoIP) or Session Initiation Protocol (SIP) data packets with a SIP/VoIP server (i.e., the other endpoint 101) using Real-Time Transport Protocol (RTP). If endpoint 101 is used to send or retrieve email, device 102 may exchange Internet Message Access Protocol (IMAP), Post Office Protocol 3 Protocol (POP3), or Simple Mail Transfer Protocol (SMTP) messages with an email server (i.e., the other endpoint 101). If endpoint 101 is used to download or stream video, device 101 may use Real Time Streaming Protocol (RTSP) to establish and control media sessions with a video server (i.e., the other endpoint 101). Alternatively, the user at endpoint 101 may access a number of websites using Hypertext Transfer Protocol (HTTP) to exchange data packets with a web server (i.e., the other endpoint 101). In some cases, communications may be had using the GPRS Tunneling Protocol (GTP). It will be understood that packets exchanged between devices 101 may conform to numerous other protocols now known or later developed.

Network monitoring system 103 may be used to monitor the performance of network 100. Particularly, monitoring system 103 captures packets that are transported across links or interfaces 104 between nodes 102, endpoints 101, and/or any other network links or connections (not shown). In some embodiments, packet capture devices may be non-intrusively coupled to network links 104 to capture substantially all of the packets transmitted across the links. Although only three links 104 are shown in FIG. 1, it will be understood that in an actual network there may be dozens or hundreds of physical, logical or virtual connections and links between network nodes. In some cases, network monitoring system 103 may be coupled to all or a high percentage of these links. In other embodiments, monitoring system 103 may be coupled only to a portion of network 100, such as only to links associated with a particular carrier or service provider. The packet capture devices may be part of network monitoring system 103, such as a line interface card, or may be separate components that are remotely coupled to network monitoring system 103 from different locations.

Monitoring system 103 may include one or more processors running one or more software applications that collect, correlate and/or analyze media and signaling data packets from network 100. Monitoring system 103 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. In some embodiments, these operations may be provided, for example, by the IRIS® toolset available from Tektronix, Inc., although other suitable tools may exist or be later developed. The packet capture devices coupling network monitoring system 103 to links 104 may be high-speed, high-density 10GE probes that are optimized to handle high bandwidth IP traffic, such as the GEOPROBE® G10, also available from Tektronix, Inc., although other suitable tools may exist or be later developed. A service provider or network operator may access data from monitoring system 103 via user interface station 105 having a display or graphical user interface 106, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 103 may further comprise internal or external memory 107 for storing captured data packets, user session data, and configuration information. Monitoring system 103 may capture and correlate the packets associated specific data sessions on links 104. In some embodiments, related packets can be correlated and combined into a record for a particular flow, session or call on network 100. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 103 may be configured to sample (e.g., unobtrusively) related data packets for a communication session in order to track the same set of user experience information for each session and each client without regard to the protocol (e.g., HTTP, RTMP, RTP, etc.) used to support the session. For example, monitoring system 103 may be capable of identifying certain information about each user's experience, as described in more detail below. A service provider may use this information, for instance, to adjust network services available to endpoints 101 such as the bandwidth assigned to each user, and the routing of data packets through network 100.

As the capability of network 100 increases toward 10GE and beyond (e.g., 100GE), each link 104 may support more users' flows and sessions. Thus, in some embodiments, link 104 may be a 10GE or a collection of 10GE links (e.g., one or more 100GE links) supporting thousands or tens of thousands of users or subscribers. Many of the subscribers may have multiple active sessions, which may result in an astronomical number of active flows on link 104 at any time where each flow includes many packets.

Figure 2:
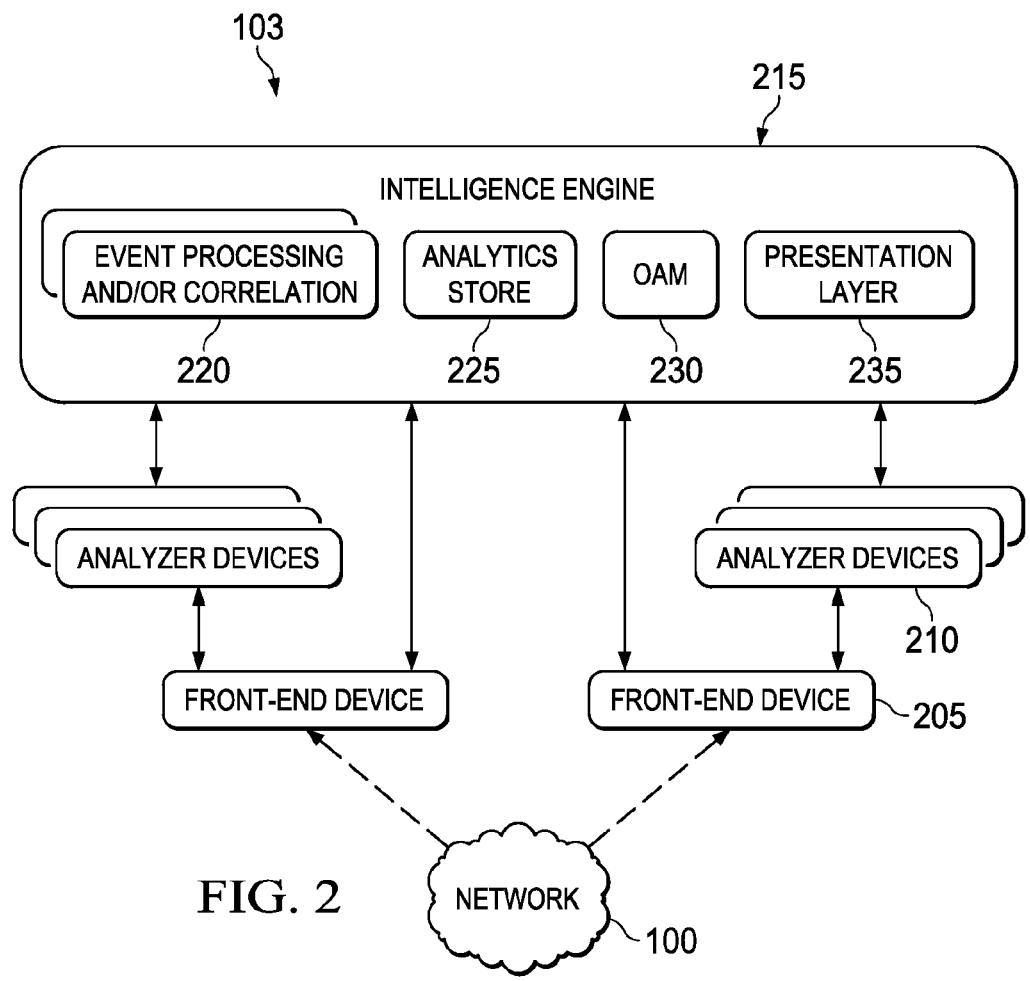
FIG. 2 is a block diagram of an example of a hierarchical network monitoring system according to some embodiments.

Turning to FIG. 2, an example of network monitoring system 103 is illustrated according to some embodiments. As shown, one or more front-end monitoring devices or probes 205 (i.e., a first tier of a three-tiered architecture) may be coupled to network 100. Each of front-end devices 205 may also be coupled to one or more network analyzer devices 210 (i.e., a second tier), which in turn may be coupled to intelligence engine 215 (i.e., a third tier). Front-end devices 205 may also be directly coupled to intelligence engine 215, as described in more detail below. Typically, front-end devices 205 may be capable or configured to process data at rates that are higher (e.g., about 10 or 100 times) than analyzers 210. Although the system of FIG. 2 is shown as a three-tier architecture, it should be understood by a person of ordinary skill in the art in light of this disclosure that the principles and techniques discussed herein may be extended to a smaller or larger number of tiers (e.g., a single-tiered architecture, a four-tiered architecture, etc.).

Generally speaking, front-end devices 205 may passively tap into network 100 and monitor all or substantially of its data. For example, such one or more of front-end devices 205 may be coupled to one or more links 104 of network 100 shown in FIG. 1. Meanwhile, analyzer devices 210 may receive and analyze a subset of the traffic that is of interest, as defined by one or more rules. Intelligence engine 215 may include a plurality of distributed components configured to perform further analysis and presentation of data to users. For example, intelligence engine may include Event Processing and/or Correlation (EPC) 220; analytics store 225; Operation, Administration, and Maintenance (OAM) module 230; and presentation layer 235.

In some embodiments, front-end devices 205 may be configured to monitor all of the network traffic that it is tapped into (e.g., 10GE, 100GE, etc.). Front-end devices 205 may also be configured to intelligently distribute traffic based on a user session level. Additionally or alternatively, front-end devices 205 may distribute traffic based on a transport layer level. In some cases, each device 205 may analyze traffic intelligently to distinguish high-value traffic from low-value traffic based on a set of heuristics. Examples of such heuristics may include, but are not limited to, IMEI (International Mobile Equipment Identifier) TAC code (Type Allocation Code) and SVN (Software Version Number) as well as UAProf (User Agent Profile) and UA (User Agent), a customer list (e.g., mobile subscriber identifiers (IMSI), phone numbers, etc.), traffic content, or any combination thereof. Therefore, in some implementations, front-end devices 205 may feed higher-valued traffic to a more sophisticated one of analyzers 210 and lower-valued traffic to a less sophisticated one of analyzers 210 (to provide at least some rudimentary information).

Front-end devices 205 may also be configured to aggregate data to enable backhauling, to generate netflows and certain Key Performance Indicator (KPI) calculations, time stamping of data, port stamping of data, filtering out unwanted data, protocol classification, and deep packet inspection (DPI) analysis. In addition, front-end devices 205 may be configured to distribute data to the back-end monitoring tools (e.g., analyzers 210 and/or intelligence engine 215) in a variety of ways, which may include flow based or user session based balancing. Devices 205 may also receive dynamic load information (e.g., namely CPU and memory utilization) from each of analyzer devices 210 so to enable intelligent distribution of data.

Analyzer devices 210 may be configured to passively monitor a subset of the traffic that has been forwarded to it by the front-end device(s) 205. Analyzer devices 210 may also be configured to perform stateful analysis of data, extraction of key parameters for call correlation and generation of call data records (CDRs), application specific processing, computation of application specific KPIs, and communication with intelligence engine 215 for retrieval of KPIs (e.g., in real-time and/or historical mode). In addition, analyzer devices 210 may be configured to notify front-end device(s) 205 regarding its CPU and/or memory utilization so that front-end device(s) 205 can utilize this information to intelligently distribute traffic.

Intelligence engine 215 may follow a distributed and scalable architecture. In some embodiments, EPC module 220 may receive events and may correlate information from front-end and analyzer devices 205 and 210, respectively. OAM module 230 may be used to configure and/or control front-end device 205 and analyzer devices 210, distribute software or firmware upgrades, etc. Presentation layer 235 may be configured to present event and other relevant information to the end-users. Analytics store 225 may include a storage or database for the storage of analytics data or the like.

In some implementations, analyzer devices 210 and/or intelligence engine 215 may be hosted at an offsite location (i.e., at a different physical location remote from front-end devices 205). Additionally or alternatively, analyzer devices 210 and/or intelligence engine 215 may be hosted in a cloud environment.

Figure 3:
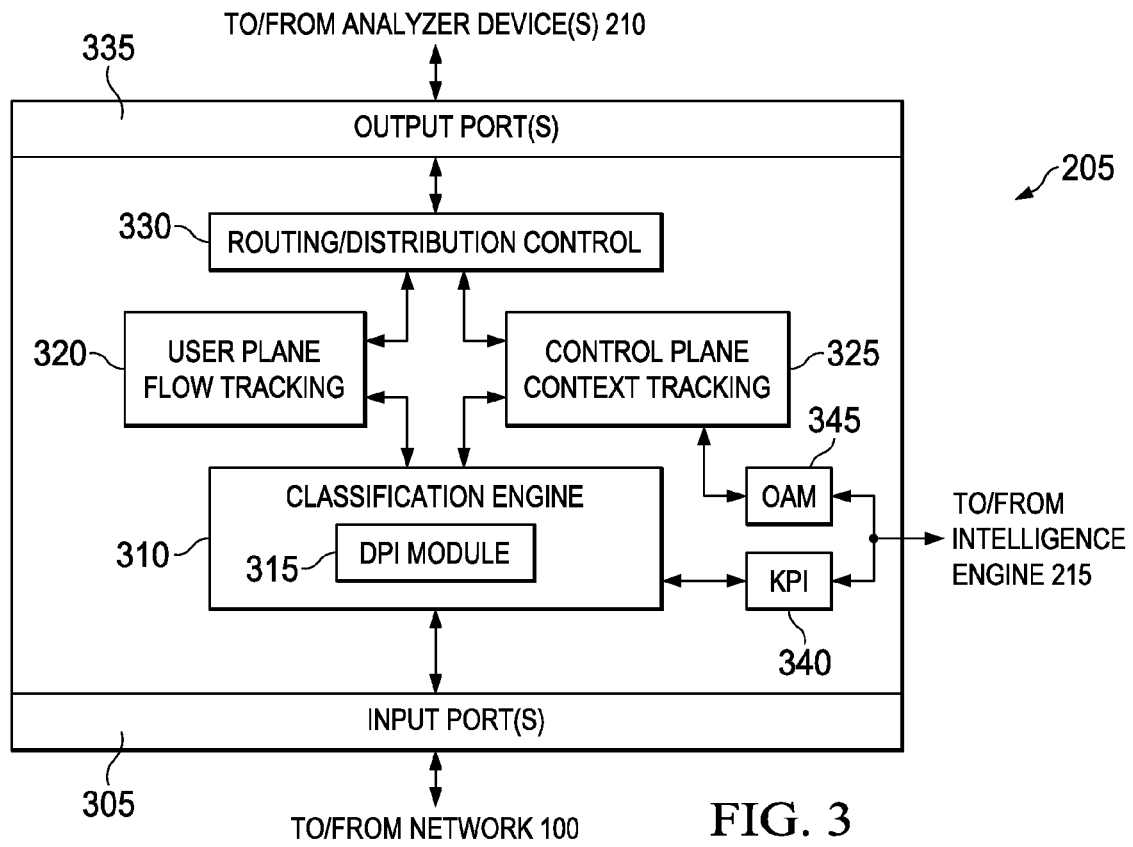
FIG. 3 is a block diagram of an example of a monitoring probe according to some embodiments.

FIG. 3 is a block diagram of an example of front-end monitoring probe 205 according to some embodiments. Input port(s) 305 (e.g., 8, 40, or 100 Gb/s) may be coupled to network 100 and to classification engine 310, which may include DPI module 315. Classification engine 310 may be coupled to user plane (UP) flow tracking module 320 and to control plane (CP) context tracking module 325, which may be coupled to routing/distribution control engine 330. Routing engine 330 may be coupled to output port(s), which in turn may be coupled to one or more analyzer devices 210. In some embodiments, KPI module 340 and OAM module 345 may also be coupled to classification engine 310 and/or tracking modules 320/325, as well as to intelligence engine 215.

In some implementations, front-end probe or device 205 may be configured to receive traffic from network 100, for example, at a given data rate (e.g., 10 Gb/s, 100 Gb/s, etc.), and to transmit selected portions of that traffic to one or more analyzers 210, for example, at a different data rate. Classification engine 310 may identify user sessions, types of content, transport protocols, etc. (e.g., using DPI module 315) and transfer UP packets to flow tracking module 320 and CP packets to context tracking module 325. In some cases, classification engine 310 may implement one or more rules to allow it to distinguish high-value traffic from low-value traffic and to label processed packets accordingly. Routing/distribution control engine 330 may implement one or more load balancing or distribution operations, for example, to transfer high-value traffic to a first analyzer and low-value traffic to a second analyzer. Moreover, KPI module 340 may perform basic KPI operations to obtain metrics such as, for example, bandwidth statistics (e.g., per port), physical frame/packet errors, protocol distribution, etc.

OAM module 345 of front-end device 205 may be coupled to OAM module 230 of intelligence engine 215 and may receive control and administration commands, such as, for example, rules that allow classification engine 310 to identify particular types of traffic. For example, based on these rules, classification engine 310 may be configured to identify and/or parse traffic by user session (e.g., IMEI, IP address, phone number, etc.). In some cases, classification engine 310 may be session context aware (e.g., web browsing, protocol specific, etc.). Further, front-end device 205 may be SCTP connection aware to ensure, for example, that all packets from a same connection are routed to the same one of analyzers 210.

In various embodiments, blocks 305-345 may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Figure 4:
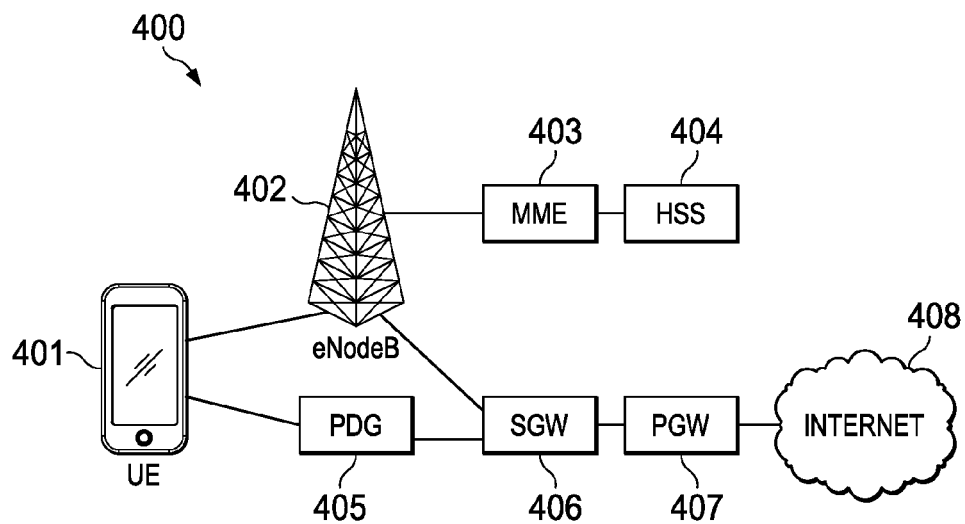
FIG. 4 is a block diagram of an example of a 3rd Generation Partnership Project (3GPP) System Architecture Evolution (SAE) network where a monitoring system may be deployed according to some embodiments.

FIG. 4 is a block diagram of an example of a 3$^{rd}$ Generation Partnership Project (3GPP) System Architecture Evolution (SAE) network 400 where monitoring system 103 may be deployed according to some embodiments. As illustrated, User Equipment (UE) 401 is coupled to one or more Evolved Node Bs (eNodeBs) 402 and to Packet Data Gateway (PDG) 405. Meanwhile, eNodeB 402 is coupled to Mobility Management Entity (MME) 403, which is coupled to Home Subscriber Server (HSS) 404. PDG 405 and eNodeB 402 are each coupled to Serving Gateway (SGW) 406, which is coupled to Packet Data Network (PDN) Gateway (PGW) 407, and which in turn is coupled to Internet 408, for example, via an Internet Protocol (IP) Multimedia Subsystem (IMS) (not shown).

Generally speaking, eNodeB 402 may include hardware configured to communicate with UE 401. MME 403 may serve as a control-node for the access portion of network 400, responsible for tracking and paging UE 401, coordinating retransmissions, performing bearer activation/deactivation processes, etc. MME 403 may also responsible for authenticating a user (e.g., by interacting with HSS 404). HSS 404 may include a database that contains user-related and subscription-related information to enable mobility management, call and session establishment support, user authentication and access authorization, etc. PDG 405 may be configured to secure data transmissions when UE 401 is connected to the core portion of network 400 via an untrusted access. SGW 406 may route and forward user data packets, and PDW 407 may provide connectivity from UE 401 to external packet data networks, such as, for example, Internet 408.

In operation, one or more of elements 402-407 may perform one or more Authentication, Authorization and Accounting (AAA) operation(s), or may otherwise execute one or more AAA application(s). For example, typical AAA operations may allow one or more of elements 402-407 to intelligently control access to network resources, enforce policies, audit usage, and/or provide information necessary to bill a user for the network's services.

In particular, "authentication" provides a way of identifying a user. An AAA server (e.g., HSS 404) compares a user's authentication credentials with other user credentials stored in a database, and, if the credentials match, may grant access to the network. Then, a user may gain "authorization" for performing certain tasks (e.g., to issue predetermined commands), access certain resources or services, etc., and an authorization process determines whether the user has authority do so. Finally, an "accounting" process may be configured to measure resources that a user actually consumes during a session (e.g., the amount of time or data sent/received) for billing, trend analysis, resource utilization, and/or planning purposes.

These various AAA services are often provided by a dedicated AAA server and/or by HSS 404. A current standard protocol by which elements 402, 403, and/or 405-407 may interface with HSS 404 is the Diameter protocol. The Diameter protocol provides an AAA framework for applications such as network access or IP mobility. Diameter is also intended to work in both local AAA and roaming situations. Certain Internet standards that specify the message format, transport, error reporting, accounting, and security services used by Diameter applications are outlined, for example, in the Internet Engineering Task Force (IETF)'s Request for Comments (RFC) 3588, 5719, and/or 6733.

Although FIG. 4 shows a 3GPP SAE network 400, it should be noted that network 400 is provided as an example only. As a person of ordinary skill in the art will readily recognize in light of this disclosure, at least some of the techniques described herein may be equally applicable to other types of networks including other types of technologies (e.g., CDMA, CDMA 2G, EVDO 3G etc.).

FIG. 5 is a block diagram of an example of a Diameter portion of a network where a monitoring system may be deployed according to some embodiments. As shown, Diameter client 502 communicates with Diameter device or core 501 via ingress interface or hop 504, and Diameter core 501 communicates with Diameter server 503 via egress interface or hop 505. Examples of Diameter client 502 include, but are not limited to, MME 403, SGW 406, and/or PGW 407 or FIG. 4, whereas examples of Diameter server 503 include HSS 404 and/or other suitable AAA server. Meanwhile, Diameter core 501 may include one or more Diameter Signaling Routers (DSRs) or Diameter Routing Agents (DRAs), generically referred to as Diameter Core Agents (DCAs), which are discussed in more detail in connection with FIG. 6 below.

In order to execute AAA application(s) or perform AAA operation(s), Diameter client 502 may exchange one or more messages with Diameter server 503 via Diameter core 501 using the Diameter protocol. Particularly, each Diameter call may include at least 4 messages: first or ingress request 506, second or egress request 507, first or egress response 508, and second or ingress response 509. The header portion of these messages may be altered by Diameter core 501 during the communication process, thus making it challenging for a monitoring solution to correlate these various messages or otherwise determine that those messages correspond to a single call.

In some embodiments, however, the systems and methods described herein enable correlation of messages exchanged over ingress hops 504 and egress hops 505. For example, ingress and egress hops 504 and 505 of Diameter core 501 may be correlated by monitoring system 103, thus alleviating the otherwise costly need for correlation of downstream applications.

In some implementations, monitoring system 103 may be configured to receive first request 506, second request 507, first response 508, and second response 509. Monitoring system 103 may correlate first request 506 with second response 509 into a first transaction, and it may also correlate second request 507 with first response 508 into a second transaction. Both transactions may then be correlated as a single Diameter call, and provided in an External Data Representation (XDR) or the like. This process may allow downstream applications to construct an end-to-end view of the Diameter call, and provide KPIs between LTE endpoints.

Also, in some implementations, a concept called "Intelligent Delta Monitoring" may be employed, which may involve processing ingress packets fully but then only a "delta" in the egress packets. Particularly, the inventors hereof have determined that Diameter core 501 only modifies a few specific Attribute-Value Pairs (AVPs) of the ingress packet's header, such as IP Header, Origin-Host, Origin-Realm, and Destination-Host. Diameter core 501 also adds a Route-Record AVP to egress request messages. Accordingly, in some cases, only the modified AVPs may be extracted without performing full decoding transaction and session tracking of egress packets. Consequently, a monitoring probe with a capacity of 200 k Packets Per Section (PPS) may obtain an increase in processing capacity to 300 k PPS or more—i.e., a 50% performance improvement. Such an improvement is even more important when one considers that a typical implementation may have several probes monitoring a single DCA, and several DCAs in the same Diameter core 501.

Additionally or alternatively, the load distribution within Diameter core 501 may be measured and presented. As discussed in connection with FIG. 6, each Diameter core 501 may include a plurality of message processing blades and/or interface cards, each of which may be associated with its own unique origin host AVP. In some cases, using the origin host AVP in the egress request message as a key may enable measurement of the load distribution within Diameter core 501, and may help network operators troubleshoot it.

FIG. 6 is a block diagram of an example of a Diameter core 501 according to some embodiments. For ease of explanation, Diameter core 501 of FIG. 6 includes a single DCA. It should be noted, however, that other implementations may include a plurality of DCAs. As illustrated, multiplexer module 600 may be configured to receive and transmit Diameter traffic from and to Diameter client 502 and Diameter server 503. Load balancing module 601 may receive traffic from multiplexer 600, and it may allocate that traffic across various message processing blades (MPs) 602A-N in order to optimize operation of Diameter core 501.

For example, each of MPs 602A-N may perform one or more operations upon packets received via multiplexer 600, and may send them to a particular destination, also via multiplexer 600. In that process, each of MPs 602A-N may alter one or more AVPs contained in these packets, as well add new AVPs to those packets (typically to the header). Generally speaking, however, network monitoring system 103 does not have visibility into the inner workings of Diameter core 501; hence would ordinarily be difficult for network monitoring system 103 to accurately and quickly correlate transactions based upon packets observed over links 506-509.

Here it may be noted that an example of a Diameter header present each of packets 506-509 has the following format, as shown in Table I:

TABLE I

| Offset (Bits) | Content |
| --- | --- |
| 0 | Version, message length |
| 32 | Command code |
| 64 | Application ID |
| 96 | Hop-by-Hop ID |
| 128 | End-to-End ID |
| 160 | AVPs |

In this illustrative Diameter header, the "version" and "length" fields identify the Diameter protocol version being used as well as the size of the message, typically including the header fields. The 32-bit "Application ID" field is used to identify which application the message concerns (e.g., an authentication or accounting application). The 32-bit "Hop-by-Hop ID" field aids in matching requests and responses; a sender ensures that the Hop-by-Hop ID is unique on a give connection at a given time. The 32-bit "End-to-End ID" field may be used to detect duplicate messages, and may include bits of the current time as well as random values. Also, there may be dozens or hundreds of AVPs included in the Diameter header. Examples of AVPs include: session ID, IP header, origin host, origin realm, and destination host, among many others.

As the inventors hereof have discovered, careful selection of particular ones of the many different fields in the Diameter header of messages 506-509 may enable network monitoring system 103 to correlate the corresponding transactions and Diameter calls while reducing or minimizing the number of operations required to performs such correlations.

FIG. 7 is a flowchart of an example of method 700 for monitoring traffic across Diameter core 501 according to some embodiments. At block 701, method 700 may include receiving a first set of messages at telecommunications monitoring system 103, the first set of messages transmitted between Diameter client 502 and Diameter device 501. As noted above, the first set of messages may follow a Diameter protocol, and Diameter device 501 may include one or more DCAs. For example, the first set of messages may include ingress request 506 and ingress response 509. Messages 506 and 509 may be correlated into a first transaction, for example, by matching an Internet Protocol (IP) address and a Hop-by-Hop identifier (ID) in request 506 against an IP address and Hop-by-Hop ID in response 509.

At block 702, method 700 may include receiving a second set of messages at telecommunications monitoring system 103, the second set of messages transmitted between Diameter device 501 and Diameter server 503. The second set of messages may include egress request 507 and egress response

508. Messages 507 and 508 may also be correlated into a second transaction, for example, by matching an Internet Protocol (IP) address and a Hop-by-Hop identifier (ID) in egress request 507 against an IP address and Hop-by-Hop ID in egress response 508.

At block 703, method 700 may include correlating the first set of one or more messages with the second set of one or more messages as part of a single Diameter call. For example, the correlation may be made by matching an origin host and an End-to-End identifier (ID) in the first transaction against the origin host and the End-to-End ID in the second transaction. Additionally or alternatively, the correlation may be made by matching a session identifier (ID) Attribute-Value Pair (AVP) and an End-to-End ID in the first transaction against the session ID AVP and the End-to-End ID in the second transaction.

In connection with the application of method 700, the inventors hereof have observed that the End-to-End ID AVP is unchanged by a DCA within Diameter core 501, and remains the same in all messages 506-509. The origin host AVP in combination with the End-to-End ID AVP therefore uniquely identifies a packet in the entire network. Furthermore, the Hop-by-Hop ID AVP is changed by the DCA, and is unique for a request/response transaction per hop. For example, across ingress hop 504, a same Hop-by-Hop ID is shared only between corresponding request 506 and response 509, and not any other message exchanged over that hop. Similarly, across egress hop 505, a same Hop-by-Hop ID is shared only between corresponding request 507 and response 508.

In some implementations, the origin host AVP may be changed by the DCA. In that case, because each of message processing blade(s) 602A-N in the DRA has a connection to Diameter Server 404, each MP 602A-N registers itself with a unique origin host. Thus, the origin host AVP may on egress transactions may be used to calculate the distribution of traffic load inside the DCA.

The session ID AVP may be assumed to be unchanged by the DCA. This AVP is globally unique and contains the same origin ID part in all of messages 506-509. For example, according to RFC 3588, the session ID AVP is populated as <DiameterIdentity>;<high 32 bits>;<low 32 bits>[;<optional value>], where the "DiameterIdentity" is the same as the origin host AVP. Also, according to RFC 3588, for instance, a relay or proxy DCA has to append a Route-Record AVP to all requests forwarded by it. The Route-Record AVP contains the identity of the peer the request was received from. Thus, the Route-Record AVP may also be used to indicate on the DCA probe if ingress/egress is monitored on the same probe.

In some embodiments, network monitoring system 103 may process ingress messages fully, and only process egress messages minimally, even if ingress arrives before egress. For example, if front-end probe 205 receives a request without a Route-Record AVP, it may store the packet as-is. If front-end probe 205 receives a request with Route-Record AVP, however, the packet may be tagged as a duplicate and a new entry with key <srcIP+hop-by-hop AVP> and timestamp of the request may be stored. Then, front-end probe 205 may get a response, in which case it may look it by <destIP+hop-by-hop AVP>. If an entry is found, it may be deleted and the packet may be tagged as a duplicate with added metadata indicating the latency time (response time minus request time) and other data. Thus, only the duplicate response is delivered to analyzer device(s) 210, which conveys the transaction information (latency time and other data). Then, front-end probe 205 may get a second response, a lookup by <destIP+hop-by-hop AVP> may fail, and the packet may be delivered to the analyzer device(s) 210 as-is.

Again, in some cases, correlating the transaction with the second transaction may include extracting a larger number of Attribute-Value Pairs (AVPs) from the first set of messages than from the second set of messages using the Intelligent Delta Monitoring principles outlined above. For example, in some cases, only modified AVP(s) from the second set of messages may be extracted.

In some situations, if an egress-side message arrives at network monitoring system 103 before a corresponding ingress-side message, a session record may be created based upon the duplicate first. Another option is to delay the egress packets; although the probability that egress arrives before ingress is reduced. In other words, there is a higher chance that ingress request is seen before the egress response. In the low probability case that egress response is delivered ahead of the ingress request, the egress response packet may be placed in a 2-second delay queue (or some other predetermined delay), or the like. When that delay expires, the egress response may be processed, and by then the ingress request will have arrived. If the ingress request has still not arrived, however, the egress response may be subject to conventional transaction tracking.

Additionally or alternatively, if an egress response arrives at network monitoring system 103 before a corresponding egress request, the response may be held for 5 seconds (or another predetermined amount of time) waiting for the egress request. If the egress request fails to arrive within that time frame, only the response is delivered as an incomplete transaction. Alternatively if the egress response does not arrive within 5 seconds of the egress request, only the egress request is delivered as a timeout transaction.

Figure 8:
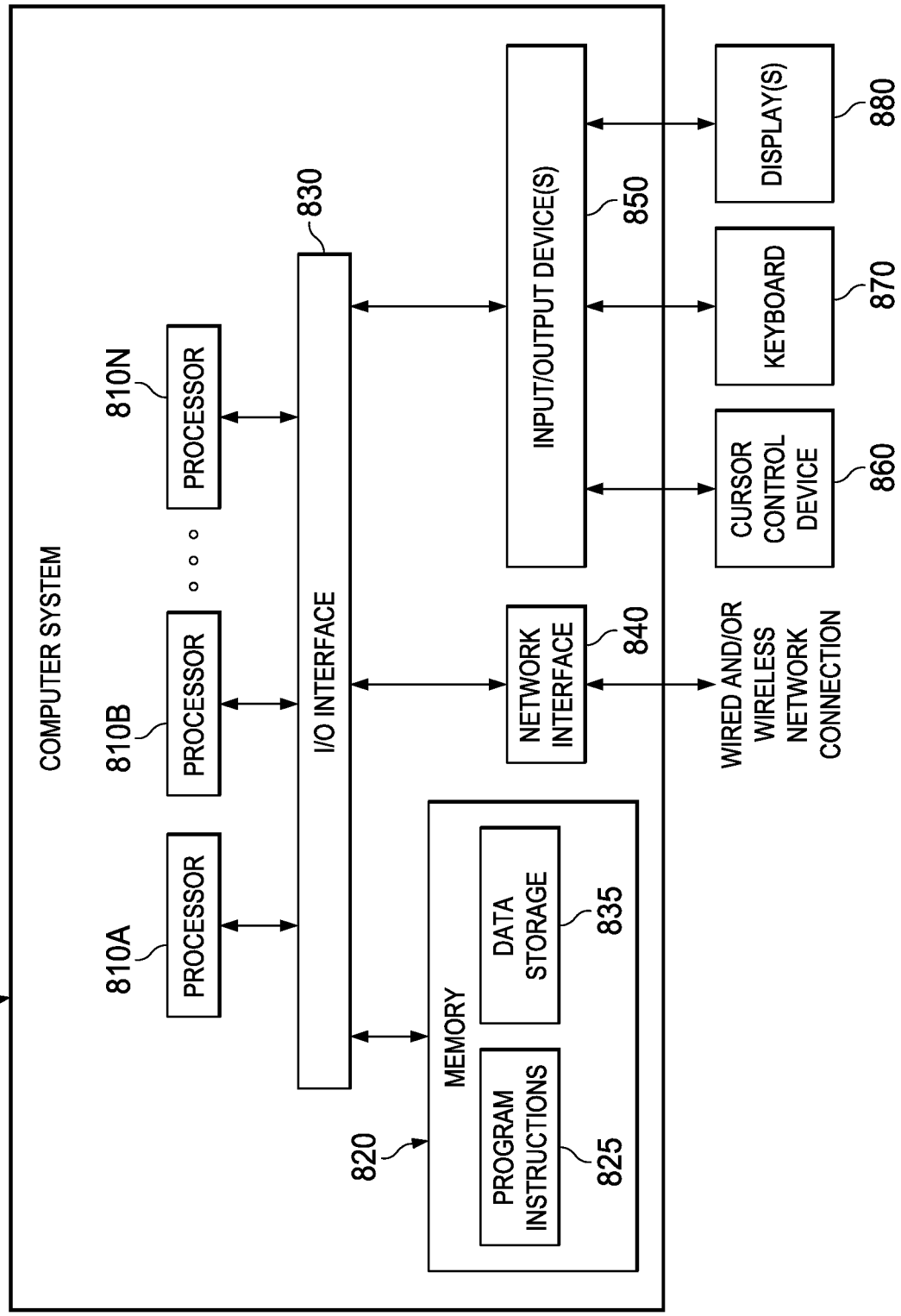
FIG. 8 is a block diagram of a computer system configured to implement various systems and methods described herein according to some embodiments.

Aspects of network monitoring system 103 may be implemented or executed by one or more computer systems. One such computer system is illustrated in FIG. 8. In various embodiments, computer system 800 may be a server, a mainframe computer system, a workstation, a network computer, a desktop computer, a laptop, or the like. For example, in some cases, front-end monitoring probe 205 shown in FIG. 2 may be implemented as computer system 800. Moreover, one or more of analyzer devices 210, intelligence engine 215, and/or MPs 601A-N may include one or more computers in the form of computer system 800. As explained above, in different embodiments these various computer systems may be configured to communicate with each other in any suitable way, such as, for example, via network 100.

As illustrated, computer system 800 includes one or more processors 810A-N coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, a given entity (e.g., network monitoring system 103) may be implemented using a single instance of computer system 800, while in other embodiments multiple such systems, or multiple nodes making up computer system 800, may be configured to host different portions or instances of embodiments. For example, in an embodiment some elements may be implemented via one or more nodes of computer system 800 that are distinct from those nodes implementing other elements (e.g., a first computer system may implement classification engine 310 while another computer system may implement routing/distribution control module 330).

In various embodiments, computer system 800 may be a single-processor system including one processor 810A, or a multi-processor system including two or more processors 810A-N (e.g., two, four, eight, or another suitable number).

Processor(s) 810A-N may be any processor capable of executing program instructions. For example, in various embodiments, processor(s) 810A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 810A-N may commonly, but not necessarily, implement the same ISA. Also, in some embodiments, at least one processor(s) 810A-N may be a graphics processing unit (GPU) or other dedicated graphics-rendering device.

System memory 820 may be configured to store program instructions and/or data accessible by processor(s) 810A-N. In various embodiments, system memory 820 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-accessible medium may include any tangible, non-transitory storage media or memory media such as magnetic or optical media—e.g., disk or CD/DVD-ROM coupled to computer system 800 via I/O interface 830.

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor(s) 810A-N). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor(s) 810A-N.

Network interface 840 may be configured to allow data to be exchanged between computer system 800 and other devices attached to network 115, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 850 may, in some embodiments, include one or more display terminals, keyboards, keypads, touch screens, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 825, configured to implement certain embodiments described herein, and data storage 835, comprising various data accessible by program instructions 825. In an embodiment, program instructions 825 may include software elements of embodiments illustrated in FIG. 2. For example, program instructions 825 may be implemented in various embodiments using any desired programming language, scripting language, or combination of programming languages and/or scripting languages (e.g., C, C++, C#, JAVA®, JAVASCRIPT®, PERL®, etc.). Data storage 835 may include data that may be used in these embodiments. In other embodiments, other or different software elements and data may be included.

A person of ordinary skill in the art will appreciate that computer system 800 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various techniques described herein may be implemented in software, hardware, or a combination thereof. The order in which each operation of a given method is performed may be changed, and various elements of the systems illustrated herein may be added, reordered, combined, omitted, modified, etc. It will be understood that various operations discussed herein may be executed simultaneously and/or sequentially. It will be further understood that each operation may be performed in any order and may be performed once or repetitiously. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
receiving a first set of one or more messages at a telecommunications monitoring system, the first set of one or more messages transmitted between a Diameter client and a Diameter device, the first set of one or more messages includes a request and a response;
correlating the request with the response;
receiving a second set of one or more messages at the telecommunications monitoring system, the second set of one or more messages transmitted between the Diameter device and a Diameter server; and
correlating the first set of one or more messages with the second set of one or more messages as part of a single Diameter call.

2. The method of claim 1, wherein the first and second sets of one or more messages follow a Diameter protocol, and wherein the Diameter device is a Diameter Signaling Router (DSR) or Diameter Signaling Agent (DSA).

3. The method of claim 1, wherein correlating the request with the response includes matching an Internet Protocol (IP) address and a Hop-by-Hop identifier (ID) in the request against the IP address and the Hop-by-Hop ID in the response.

4. The method of claim 1, wherein the second set of one or more messages includes another request and another response, the method further comprising correlating the other request with the other response.

5. The method of claim 4, wherein correlating the other request with the other response includes matching an Internet Protocol (IP) address and a Hop-by-Hop identifier (ID) in the other request against the IP address and the Hop-by-Hop ID in the other response.

6. The method of claim 1, wherein correlating the first set of one or more messages with the second set of one or more messages includes matching an origin host and an End-to-End identifier (ID) in the first set of one or more messages against the origin host and the End-to-End ID in the second set of one or more messages.

7. The method of claim 1, wherein correlating the first set of one or more messages with the second set of one or more messages includes matching a session identifier (ID) Attribute-Value Pair (AVP) and an End-to-End ID in the first set of one or more messages against the session ID AVP and the End-to-End ID in the second set of one or more messages.

8. The method of claim 1, wherein correlating the first set of one or more messages with the second set of one or more messages includes extracting a larger number of Attribute-Value Pairs (AVPs) from the first set of one or more messages than from the second set of one or more messages.

9. The method of claim 8, wherein correlating the first set of one or more messages with the second set of one or more messages includes extracting only modified AVP(s) from the second set of one or more messages.

10. The method of claim 1, further comprising measuring a load distribution in the Diameter device based, at least in part, upon the correlation, and extracting an origin host AVP from an egress request message.

11. A telecommunications monitoring system, comprising:
a processor; and
a memory coupled to the processor, the memory configured to store program instructions executable by the processor to cause the telecommunications monitoring system to:
intercept (a) an ingress request transmitted from a client to a Diameter Core Agent (DCA), (b) an egress request transmitted from the DCA to a server, (c) an egress response transmitted from the server to the DCA, and (d) an ingress response transmitted from the DCA to the client;
determine that the ingress request and response match each other;
determine that the egress request and response match each other; and
correlate the ingress request and response with the egress request and response.

12. The telecommunications monitoring system of claim 11, wherein to determine that the ingress request and response match each other, the program instructions are executable by the processor to cause the telecommunications monitoring system to match an Internet Protocol (IP) address and a Hop-by-Hop identifier (ID) in the ingress request against an IP address and a Hop-by-Hop ID in the ingress response.

13. The telecommunications monitoring system of claim 11, wherein to determine that the egress request and response match each other, the program instructions are executable by the processor to cause the telecommunications monitoring system to match an Internet Protocol (IP) address and a Hop-by-Hop identifier (ID) in the egress request against an IP address and a Hop-by-Hop ID in the egress response.

14. The telecommunications monitoring system of claim 11, wherein to correlate the ingress request and response with the egress request and response, the program instructions are executable by the processor to cause the telecommunications monitoring system to match an origin host and an End-to-End identifier (ID) in the ingress request and response against the origin host and the End-to-End ID in the egress request and response.

15. The telecommunications monitoring system of claim 11, wherein to correlate the ingress request and response with the egress request and response, the program instructions are executable by the processor to cause the telecommunications monitoring system to match a session identifier (ID) Attribute-Value Pair (AVP) and an End-to-End ID in the ingress request and response against the session ID AVP and the End-to-End ID in the egress request and response.

16. The telecommunications monitoring system of claim 11, wherein the program instructions are executable by the processor to cause the telecommunications monitoring system to, during the correlation, use only Attribute-Value Pairs (AVPs) from the egress request and response that have been modified by the DCA.

17. A non-transitory computer-readable storage medium having program instructions stored thereon that, upon execution by a processor within a computer system, cause the computer system to:
intercept (a) an ingress request transmitted from a client to a Diameter Core Agent (DCA), (b) an egress request transmitted from the DCA to a server, (c) an egress response transmitted from the server to the DCA, and (d) an ingress response transmitted from the DCA to the client;
determine that the ingress request and response match each other by comparing an Internet Protocol (IP) address and Hop-by-Hop identifier (ID) in the ingress request and response;
determine that the egress request and response match each other by comparing another IP address and Hop-by-Hop identifier ID in the egress request and response; and
correlate the ingress request and response with the egress request and response.

18. The non-transitory computer-readable storage medium of claim 17, wherein to correlate the ingress request and response with the egress request and response, the program instructions, upon execution, cause the computer system to match an origin host and an End-to-End identifier (ID) in the ingress request and response against the same origin host and the End-to-End ID in the egress request and response.

19. The non-transitory computer-readable storage medium of claim 17, wherein to correlate the ingress request and response with the egress request and response, the program instructions, upon execution, cause the computer system to match a session identifier (ID) Attribute-Value Pair (AVP) and End-to-End ID in the ingress request and response against the same session ID AVP and the End-to-End ID in the egress request and response.

20. The non-transitory computer-readable storage medium of claim 17, wherein the program instructions, upon execution, further cause the computer system to assess a load distribution in the DCA based upon the correlation.

* * * * *